Patented Dec. 16, 1952

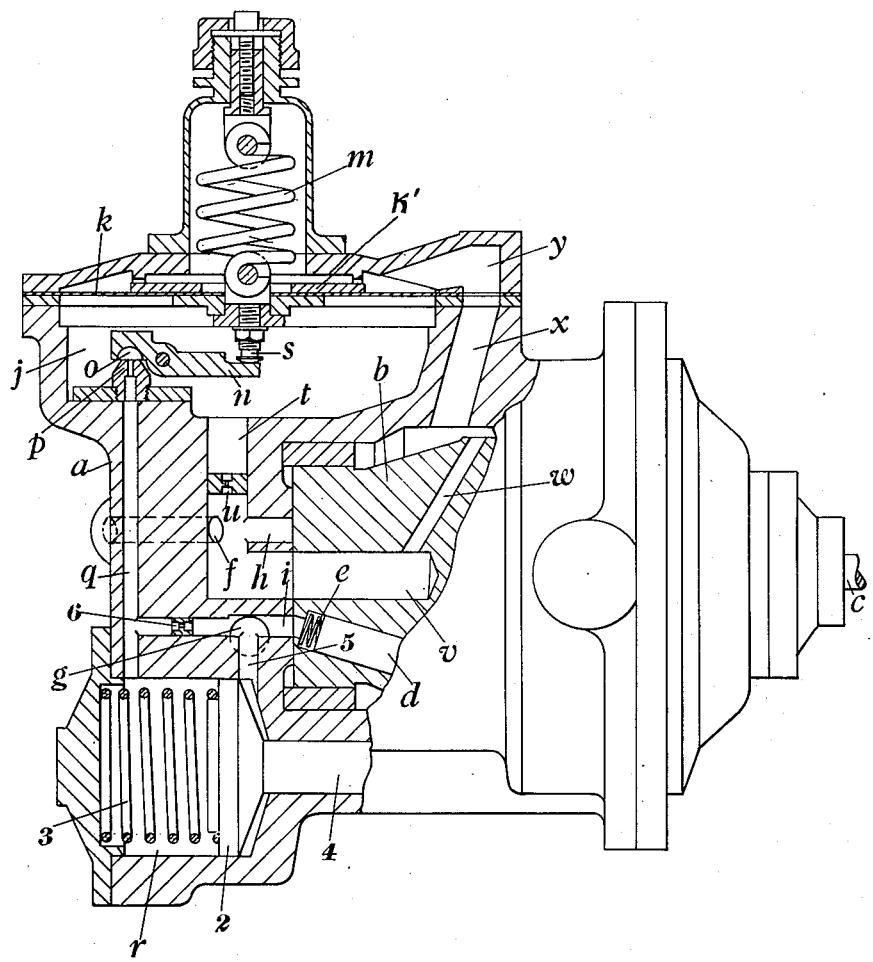

2,621,630

UNITED STATES PATENT OFFICE 2,621,630

FLUID-OPERATED MEANS FOR REGULATING THE SUPPLY OF LIQUID FUEL FROM A PUMP TO A PRIME MOVER

Richard Joseph Ifield, Dural, New South Wales, Australia, assignor to Joseph Lucas Limited, Birmingham, England Application January 24, 1950, Serial No. 140,224
In Great Britain February 9, 1949

1 Claim. (Cl. 121—38)

This invention has for its object to provide improved means for regulating the flow of liquid fuel to jet-propulsion engines, gas turbines, or other prime movers.

The accompanying drawing is a part sectional side elevation illustrating one embodiment of the invention.

In the example illustrated by the drawing the features forming the subject of the invention are incorporated with the housing $a$ of a rotary pump of the swash-plate type. The pump comprises a rotary part $b$ having a driving spindle $c$. The part $b$ contains one or more reciprocatory plungers as $d$ which are moved in one direction by an angularly adjustable swash plate (not shown) and in the opposite direction by springs as $e$. The housing $a$ is provided with a liquid inlet passage $f$ and an outlet passage $g$, and these communicate respectively with ports $h$, $i$ leading to and from the pump. In the body part $a$ is formed a chamber $j$ which is bounded on one side by a flexible diaphragm $k$ (or an equivalent piston) loaded by a spring $m$, and in the chamber is arranged a valve. An annular plate $k^1$ is secured to the diaphragm $k$ and moves with it. This comprises a lever $n$ carrying a closure member $o$, which co-operates with a seating $p$ at one end of a passage $q$ leading to one end of the cylinder $r$ of a servo-mechanism. The lever is operable by a thrust piece $s$ attached to the diaphragm.

From the chamber $j$ extends a passage $t$ containing a restricted orifice $u$ situated between the chamber $j$ and the inlet passage $f$. The passage $t$ leads to an axial bore $v$ in the pump body part $b$, and from this bore extends a passage $w$ from which liquid can be discharged centrifugally at a pressure corresponding to the rate of rotation of the part $b$. This pressure is transmitted along a passage $x$ to the region $y$ at the upper side of the diaphragm $k$. The diaphragm is thus subjected to the difference of two liquid pressures, namely a pressure corresponding to the speed of rotation of the pump, and the pressure at which liquid is supplied to the pump through the passage $f$.

The servo-mechanism is of known form and comprises a piston 2 loaded by a spring 3 and associated with a plunger 4 which serves in known manner to vary the obliquity of the swash plate and hence the output of the pump. The end of the cylinder $r$ remote from the passage $q$ is in communication with the pump delivery passage $g$ by way of a passage 5. Also the passages $q$, 5 are in communication with each other through another passage containing a restricted orifice 6. When the valve above mentioned is closed, the liquid pressures acting on the opposite sides of the piston 2 are balanced and the spring 3 then moves the piston at the right, thereby causing the swash plate to take up its position of maximum obliquity and the pump to give its maximum output. When the valve is opened in response to a predetermined pressure difference acting on the opposite sides of the diaphragm $k$, the preponderating liquid pressure acting on the right hand side of the piston 2 moves the latter against the spring 3 and correspondingly reduces the pump output.

By the use of the restriction $u$ in the passage $t$ the following result is obtained. When the valve is opened, or the amount of its opening is increased, by the action of the diaphragm $k$ (or piston), additional fluid is thereby admitted to the chamber $j$, from the servo-mechanism, causing a temporary increase of the pressure in the said chamber, with consequent diminution of the effective pressure acting on the diaphragm (or piston) and resultant retardation of the continued movement of the valve. In other words, the response of the mechanism to a sudden change in the pressure difference normally acting on the diaphragm (or piston) is damped in a manner which has been found to be desirable.

Whilst in the foregoing there has been described an arrangement of the invention in combination with a known form of swash plate pump and servo-mechanism, the invention is not restricted thereto. Thus the chamber $j$, diaphragm $k$ (or equivalent piston), the associated valve and the restricted orifice $u$ may be incorporated in a separate body part to form an independent unit adapted to be connected by pipes or otherwise to the pump and servo-mechanism. Also the servo-mechanism may be made as a separate unit, and instead of employing it for controlling the pump output, it may be employed for controlling a throttle valve, a by-pass valve or other means for controlling the rate of supply of liquid fuel to the combustion chamber of the prime mover. Further, the liquid pressures acting on the diaphragm (or piston) may be derived from any appropriate source other than the pump.

Having thus described my invention what I claim as new and desire to secure by Letters Patent is:

Means for regulating the supply of liquid fuel from a pump to a prime mover comprising, in combination, a fluid-operated servo-mechanism, housing means, a spring loaded movable member located in said housing means and forming one side of each of a pair of chambers on opposite sides of said member, a passageway agording communication between said servo-mechanism and one of said chambers, a control valve in said chamber controlling said passageway and arranged to be actuated by said spring loaded movable member for releasing pressure fluid from the servo-mechanism, a second passageway affording communication between a source of fluid at relatively low pressure and said chamber and for conducting fluid from said chamber when the pressure therein is increased by pressure fluid released from said servo-mechanism under the action of the control valve, a third passageway affording communication between a source of fluid at a relatively higher pressure and the other of said chambers whereby the spring loaded movable member can be actuated in response to the opposed fluid pressures acting thereon, and flow restriction means in said second passageway whereby the response of the spring loaded movable member to sudden changes in the pressure difference acting thereon is retarded.

RICHARD JOSEPH IFIELD.

REFERENCES CITED

The following references are of record in the file of this patent:

UNITED STATES PATENTS

| Number | Name | Date |
|---|---|---|
| 2,020,847 | Mitereff | Nov. 12, 1935 |
| 2,317,383 | Hull | Apr. 27, 1943 |
| 2,407,013 | Ifield | Sept. 3, 1946 |
| 2,424,035 | Ifield | July 15, 1947 |